(12) United States Patent
Strobel et al.

(10) Patent No.: US 7,635,264 B2
(45) Date of Patent: Dec. 22, 2009

(54) ATTENUATING COMBUSTION NOISE OF PREMIXED FLAMES

(75) Inventors: Mark A. Strobel, Maplewood, MN (US); Michael J. Ulsh, Broomfield, CO (US); Melvyn C. Branch, Boulder, CO (US); Domingo Medina, Trumbull, CT (US); James Pezzuto, Hastings on Hudson, NY (US)

(73) Assignee: 3M Innovative Properties Company, St. Paul, MN (US)

( * ) Notice: Subject to any disclaimer, the term of this patent is extended or adjusted under 35 U.S.C. 154(b) by 6 days.

(21) Appl. No.: 11/961,371

(22) Filed: Dec. 20, 2007

(65) Prior Publication Data

US 2009/0162802 A1 Jun. 25, 2009

(51) Int. Cl.
*F23M 13/00* (2006.01)
(52) U.S. Cl. ............ 431/114; 431/11; 431/207; 431/208; 431/209; 431/328
(58) Field of Classification Search ............ 431/114, 431/11, 208, 328
See application file for complete search history.

(56) References Cited

U.S. PATENT DOCUMENTS

| | | | | |
|---|---|---|---|---|
| 3,684,260 A * | 8/1972 | Solbrig | .......... | 432/31 |
| 4,605,369 A * | 8/1986 | Buehl | .......... | 431/328 |
| 4,919,609 A * | 4/1990 | Sarkisian et al. | .......... | 431/7 |
| 5,368,476 A * | 11/1994 | Sugahara et al. | .......... | 431/285 |
| 5,393,222 A * | 2/1995 | Sutton | .......... | 431/80 |
| 5,525,056 A | 6/1996 | Sutton | | |
| 5,582,515 A * | 12/1996 | Eisinger et al. | .......... | 431/1 |
| 5,993,200 A | 11/1999 | Palmer-Jones | | |
| 7,008,219 B2 * | 3/2006 | Shimada et al. | .......... | 431/215 |
| 7,037,100 B2 | 5/2006 | Strobel et al. | | |
| 7,160,095 B2 | 1/2007 | Getschel et al. | | |
| 2004/0058290 A1 * | 3/2004 | Mauzey et al. | .......... | 431/243 |

* cited by examiner

*Primary Examiner*—Kenneth B Rinehart
*Assistant Examiner*—Jorge Pereiro
(74) *Attorney, Agent, or Firm*—David B. Patchett (57) ABSTRACT

Disclosure is made of methods, systems, and apparatus for changing characteristics of noise of premixed flames supported on burners by heating burner passageways by an amount that attenuates combustion noises arising from premixed flames. Alternatively, attenuation occurs by controlling a temperature differential between a first point relative to a premixed flame and at least a second point in an uncombusted portion of a fuel/oxidizer mixture causing the flame

20 Claims, 5 Drawing Sheets

ATTENUATING COMBUSTION NOISE OF PREMIXED FLAMES

BACKGROUND

The present disclosure is directed generally to methods, systems, and apparatus for changing characteristics of noise and, more particularly, to methods, systems, and apparatus for changing characteristics of noise by attenuating combustion noise arising from premixed flames.

Combustion driven oscillations are a form of combustion instability that typically occurs in premixed flames. Such instability is normally manifested in the form of noise, such as howling. Howling is generally considered to be unacceptable noise that is usually manifested in a range of 100-1000 Hz and at intensities up to about 120 dB.

Howling may be transient or continuous. Typically, transient howling occurs upon ignition of the flame and disappears after a relatively brief time (e.g., several seconds or minutes). Transient howling may be considered unacceptable. In contrast, continuous howling may continue as long as the burner is operational. Continuous howling is considered far more unacceptable. There is little known theory explaining the types of combustion oscillation that cause howling, particularly in industrial-type ribbon burners.

It is known that a variety of operating conditions may contribute to the formation of howling. For example, any specific burner construction may have a range of operating conditions in which combustion oscillations, which produce howling, may occur. In this regard, some important variables that can have an impact on this range of operating conditions are the flame power (i.e., fuel type and flow rate thereof) and burner-to-backing roll separation (i.e., "burner gap"). Unfortunately, the operating conditions at which combustion oscillations can occur for some burners are those which provide optimal burner performance.

As noted, flame stability controls formation of the combustion noise. More stable flames will have fewer tendencies to generate audible oscillations. Preheating the combustible mixture entering the burner ports tends to stabilize the flame at the attachment point to the ribbons. Fluctuations in the attachment of the flame to the ribbon initiate a pressure wave that enables the formation of combustion noise. On the other hand, impinging a flame on the chill roll surface serves to intensify a pressure wave, thus increasing the propensity to form and/or intensity of the combustion noise. Moreover, in the context of oxygen-enriched flames, the laminar flame speed and flame temperatures are greatly increased, thereby increasing the likelihood of howling. As a result, oxygen-enriched flames represent the most challenging condition for the elimination of combustion instability encountered with ribbon burners.

Without the ability to control unacceptable noises associated with operation of burners, such as ribbon burners, a relatively unhealthy and unpleasant working environment may exist. While known approaches have been undertaken to attenuate combustion noises by improving upon flame stability of burners, continuing efforts are, nevertheless, being undertaken to improve over known techniques.

SUMMARY

In an exemplary embodiment of the present disclosure, provision is made for a method for controlling noise characteristics of a flame supported on one or more ports of a burner. The method comprises: controlling a temperature differential between a first location and a second location, wherein the first location is in a flame or adjacent a leading edge of the flame, and the second location is in an uncombusted portion of a fuel/oxidizer mixture generating the flame, whereby noise characteristics of the flame are changed by controlling the temperature differential.

In another exemplary embodiment of the present disclosure, provision is made for a method of attenuating noise of premixed flames. The method comprises: controlling the temperature differential of a premixed flame supported on at least one port of a burner, wherein the temperature differential is determined between a first location and a second location, wherein the first location is in the premixed flame or immediately adjacent a leading edge of the flame, and the second location is in an uncombusted portion of a fuel/oxidizer mixture generating the premixed flame, so that the temperature differential between the first and second locations is reduced, whereby the noise of the premixed flame supported on the one port is attenuated.

In another exemplary embodiment of the present disclosure, provision is made for a method of attenuating combustion noises of premixed flames. The method comprises: generating a premixed flame from a burner port defined by each of one or more passageways in a burner body; and heating selected ones of the passageways to an extent such that combustion noise of the premixed flame is attenuated.

In another exemplary embodiment of the present disclosure, provision is made for a method of correcting for the presence of objectionable noise of premixed flames from one or more burner ports defined by each of one or more passageways in a burner body. The method comprises: determining a noise level of the premixed flames; determining the temperature of selected ones of the one or more passageways associated with a noise level; and, adjusting the temperature of the one or more passageways to an extent such that combustion noise level of the premixed flame is attenuated.

In another exemplary embodiment of the present disclosure, provision is made for an apparatus for controlling noise characteristics of a flame. The apparatus comprises: a burner body having at least one passageway, through which a fuel/oxidizer mixture flows to a port on which a flame is supported. The burner body includes at least one element that changes the temperature of an uncombusted portion of the mixture relative to a combusted portion of the fuel, so as to change a temperature differential between the uncombusted and combusted portions, whereby the noise characteristic of the flame is changed.

In another exemplary embodiment of the present disclosure, provision is made for an apparatus for controlling a noise characteristic of a flame. The apparatus comprises: a burner body having at least one passageway, through which a fuel/oxidizer mixture flows to a port, on which a flame is supported, the burner body includes at least one element that increases the temperature of an uncombusted portion of the mixture relative to a combusted portion of the fuel, so as to reduce a temperature differential between the uncombusted and combusted portions, whereby a noise characteristic of the flame is lowered.

In another exemplary embodiment of the present disclosure, provision is made for an apparatus for attenuating combustion noises of premixed flames. The apparatus comprises: a burner body having at least one passageway, through which a fuel/oxidizer mixture flows, leading to a port on which a premixed flame is supported; the burner body including at least one element being constructed of a material having a thermal conductivity and a portion defining a length of the at least one passageway such that passive heat generated by at least the premixed flame heats the one passageway to an extent for attenuating the combustion noises of a premixed flame.

In another exemplary embodiment of the present disclosure, provision is made for an apparatus for attenuating combustion noises of premixed flames. The apparatus comprises:

a burner body having at least one passageway, through which a fuel/oxidizer mixture flows, leading to a port on which a premixed flame is supported; the burner body including at least one element that is operable for actively heating the one passageway to an extent such that the combustion noises of the premixed flame are attenuated.

In another exemplary embodiment of the present disclosure, provision is made for an apparatus for flame-perforating film. The apparatus comprises: a frame; a support surface attached to the frame for supporting film to be perforated; a burner attached to the frame opposite the support surface, wherein the burner supports a premixed flame generated by combustion of a fuel/oxidizer mixture; a burner pipe connected to the burner; and a source of the fuel/oxidizer mixture coupled to the burner pipe; the burner comprising a burner body having at least one passageway, through which the fuel/oxidizer mixture flows, leading to a port on which a premixed flame is supported; the burner body including at least one element being constructed of a material having a thermal conductivity and a portion defining a length of the at least one passageway such that passive heat generated by at least the premixed flame heats the one passageway to an extent for attenuating the combustion noises of a premixed flame.

In another exemplary embodiment of the present disclosure, provision is made for a gas ribbon burner that includes a plurality of substantially parallel and corrugated ribbons defining rows of ports, wherein the improvement comprises the ribbons defining the rows of ports having a depth in a range of about 1.5 cm. or more.

In another exemplary embodiment of the present disclosure, provision is made for improvements in a process of applying heat to an article in a device to perform a function on the article by heat generated by at least a premixed flame provided by a ribbon burner coupled to the device, wherein the ribbon burner includes at least one passageway through which a fuel/oxidizer mixture flows toward a port on which the premixed flame is supported, wherein the improvement comprises: heating the one passageway to an extent such that combustion noise of the premixed flame is attenuated.

In another exemplary embodiment, the function performed on the article is from a group consisting of heating, treating, drying, perforating, embossing, cleaning, annealing, sealing, laminating, sterilizing, singeing, baking, vaporizing, branding, modifying the surface of a material, and any combination thereof.

In another exemplary embodiment of the present disclosure, provision is made for improvements in a system comprising: a device including a heating chamber for performing a function on the article by heat generated by at least a premixed flame; and, a ribbon burner coupled to the heating device, wherein the ribbon burner includes at least one passageway through which a fuel/oxidizer mixture flows toward a port on which the premixed flame is supported; wherein the improvement comprises: an element in the ribbon burner that generates heat for heating the passageway to an extent such that combustion noise of the premixed flame is attenuated.

Howling is a term that means self-sustaining combustion instability or oscillation manifested as 100-1000 Hz noise with an intensity of up to 120 dB.

Open flame is a term that is directed to a flame in an ambient condition and not within an enclosure.

Premixed flame means a flame resulting from the combustion of a fuel/oxidizer mixture that is intimately or thoroughly mixed prior to combustion.

Flame power is the product of the volume of fuel burned per unit time and the heat content of the fuel.

Burner gap is the burner face-to-backing roll separation gap in a flame treater, perforator, or other flame device.

Flame equivalence ratio means the stoichiometric oxidizer-fuel ratio divided by the actual oxidizer: fuel ratio, wherein the stoichiometric ratio is exact ratio of oxidizer to fuel needed for complete combustion

DETAILED DESCRIPTION

FIGS. 1-5 illustrate a flame-perforating apparatus 10, in which the method, system and apparatus of the present disclosure may be implemented. It will be appreciated, that the present disclosure is not to be limited to the context of a flame-perforating apparatus 10. Rather, the present disclosure encompasses broadly the control of combustion noises, including attenuation of combustion noises, of premixed flames as will be evident in the following description. The control of combustion noises of premixed flames may be beneficial in numerous circumstances, such as, without limitation, modifying the surface of articles including plastics, heating, treating, drying, perforating, embossing, cleaning, annealing, sealing, laminating, sterilizing, singeing, baking, vaporizing, branding, and any combination thereof.

The flame-perforating apparatus 10 is operable for forming perforations arranged in a herringbone pattern (not shown) in order to provide comparable tear characteristics in both the lengthwise or machine direction (MD), and the crosswise or transverse direction (TD) of plastic film. Only those aspects of the flame-perforating apparatus 10 illustrated FIGS. 1-5 are described herein. For a more complete description of the flame-perforating apparatus 10, reference is made to U.S. Pat. No. 7,037,100, which issued to some of the inventors of the present application and which patent is incorporated herein in its entirety. It will be appreciated that those aspects of the last-noted patent, which cooperate with the present disclosure, will be described herein. In FIG. 5, there is an illustration of a method, system, and apparatus according to the present disclosure, which reduces or eliminates noises arising from combustion.

Figure 1:
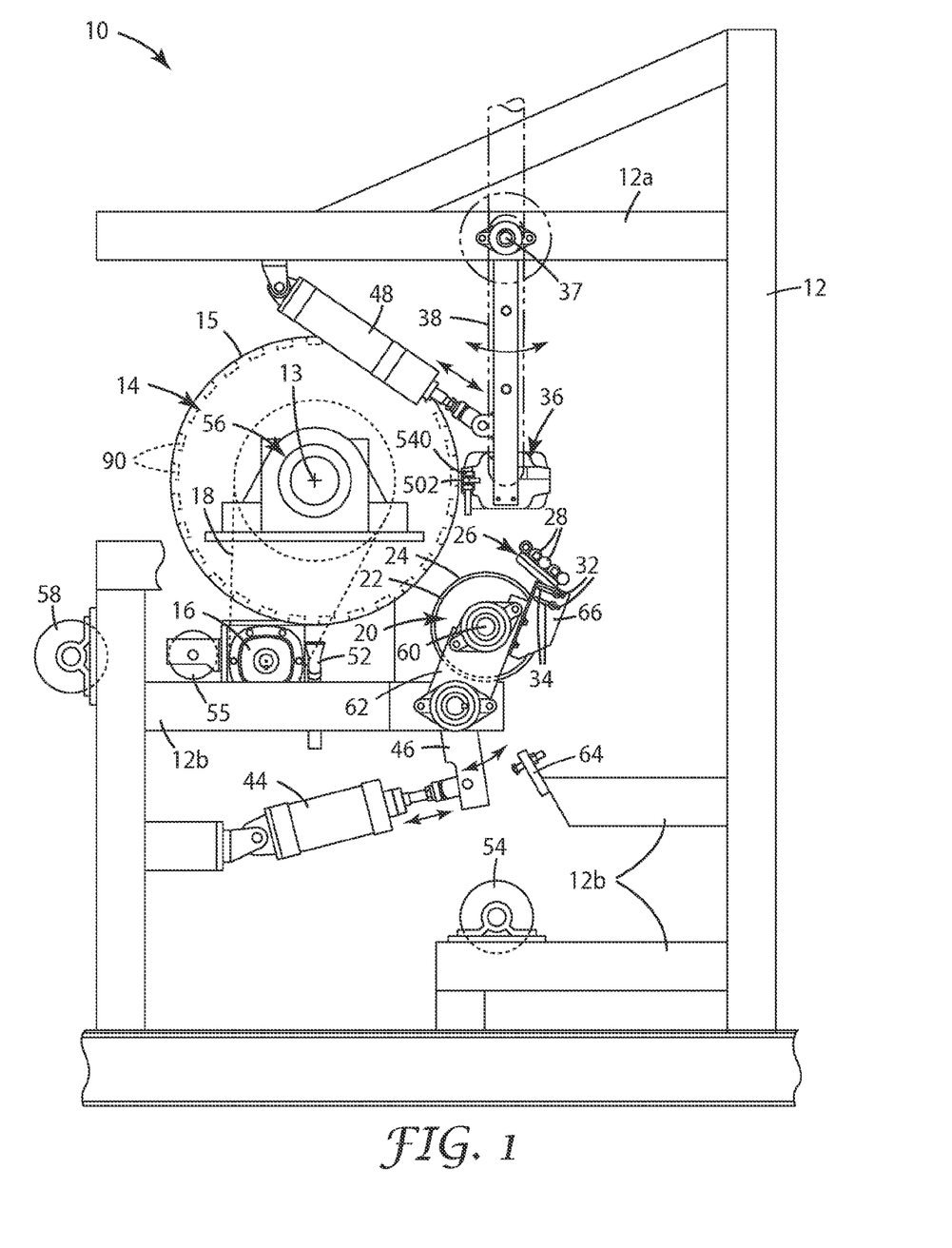
FIG. 1 is a side view of a flame-perforating apparatus that includes aspects of the present disclosure.
Figure 2:
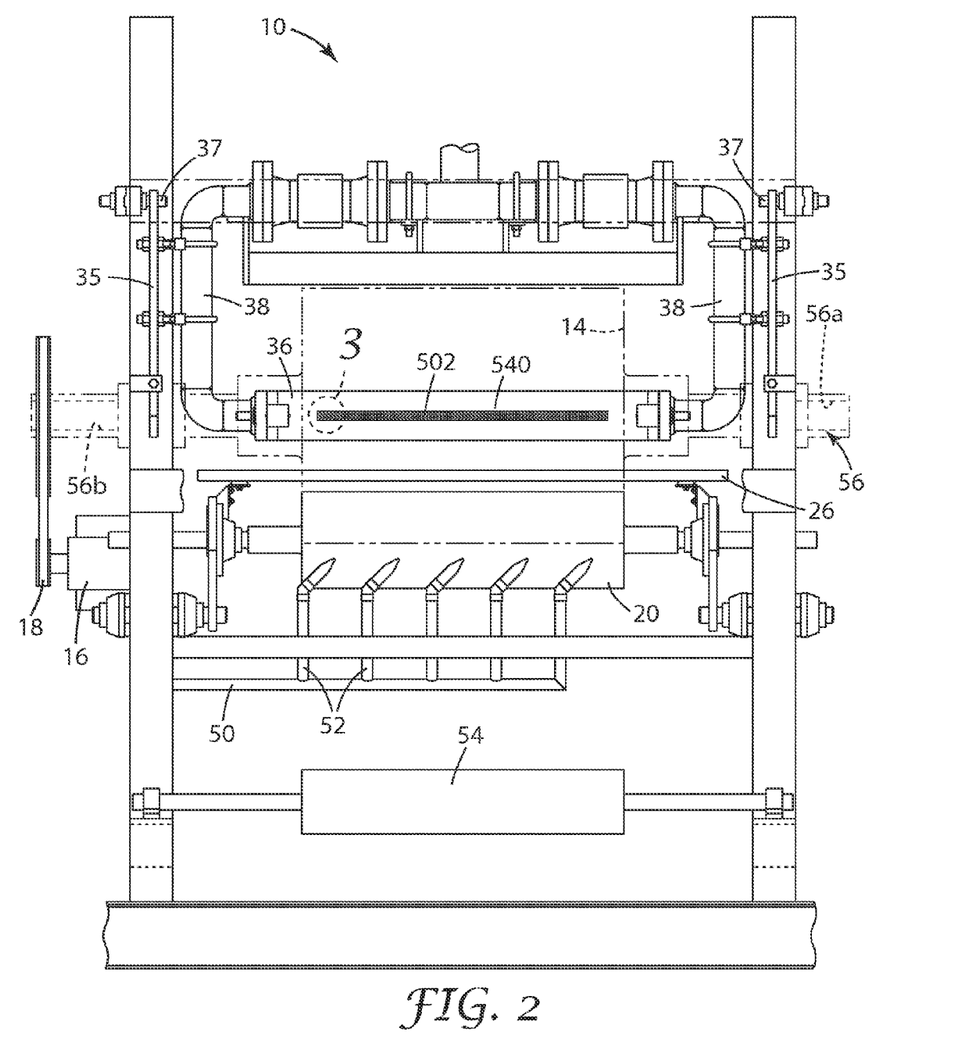
FIG. 2 is a front elevation view of the flame-perforating apparatus of FIG. 1 with two of the idler rolls and a motor removed for clarity and the backing roll shown in phantom lines.

FIGS. 1-5 are illustrations of one preferred apparatus for making flame-perforated films which embodies the aspects of the present disclosure. FIG. 1 illustrates a side view of the flame-perforating apparatus 10. FIG. 2 illustrates a front view of the flame-perforating apparatus with the backing roll 14 shown in phantom lines, and with the idler rollers 55, 38, and motor 16 removed for clarity.

FIGS. 1 and 2 illustrate that the flame-perforating apparatus 10 includes a frame 12. The frame 12 includes an upper portion 12a and a lower portion 12b. The flame-perforating apparatus 10 includes a backing apparatus or roll 14 having an outer film support surface 15. The film support surface 15 typically includes a pattern of lowered portions 90, shown in phantom lines. These lowered portions 90 and the portions of the film support surface 15 between the lowered portions 90 collectively make up the film support surface 15 of the backing roll 14. The lowered portions 90 form a pattern of indentions in the film support surface 15. The lowered portions 90 may be a plurality of depressed or recessed portions or a plurality of indentations along the film support surface 15.

These lowered portions 90 are typically etched into the film support surface 15. Alternatively, the pattern of lowered portions 90 may be drilled, ablated, or engraved into the film support surface 15.

Typically, the film support surface 15 of the backing roll 14 is temperature-controlled, relative to the ambient temperature around the flame-perforating apparatus 10. Typically, the film support surface 15 of the backing roll 14 is cooled by providing cooled water into the inlet portion 56a of hollow shaft 56, into the backing roll 14, and out of the outlet portion 56b of the hollow shaft 56. The backing roll 14 rotates about its axis 13. The flame-perforating apparatus 10 includes a motor 16 attached to the lower portion 12b of the frame.

The flame-perforating apparatus 10 includes a burner 36 and its associated burner piping 38. The burner 36 and burner piping 38 are attached to the upper portion 12a of the frame 12 by burner supports 35. The burner supports 35 may pivot about pivot points 37 by actuator 48 to move the burner 36 relative to the film support surface 15 of the backing roll 14. The supports 35 may be pivoted by the actuator 48 to position the burner 36 a desired distance either adjacent or away from the film support surface 15 of the backing roll 14, as explained in more detail with respect to FIGS. 4 and 5 below. The burner 36 includes a gas pipe section 38 on each end for providing gas to the burner 36.

In one exemplary embodiment of the present disclosure, the flame-perforating apparatus 10 includes a preheat roll 20 attached to the lower portion 12b of the frame 12. The preheat roll 20 includes an outer roll layer 22. The outer roll layer 22 includes an outer surface 24. Typically, the preheat roll 20 is a nip roll, which may be positioned against the backing roll 14 to nip the film between the nip roll 20 and backing roll 14. The nip roll 20 freely rotates about its shaft 60 and is mounted to roll supports 62.

The flame-perforating apparatus 10 may include a temperature-controlled shield 26 attached to the nip roll 20 by brackets 66 to form one assembly. The temperature-controlled shield 26 typically includes a plurality of water-cooled pipes 28. Typically, the temperature-controlled shield 26 is positioned between the burner 36 and the nip roll 20. In this position, the shield 26 protects the nip roll 20 from some of the heat generated from the burner 36, and thus, can be used to control the temperature of the outer surface 24 of the nip roll 20. The flame-perforating apparatus 10 also includes a first idle roller 54, a second idle roller 55, and a third idle roller 58 attached to the lower portion 12b of the frame 12. Each idle roller 54, 55, 58 includes its own shaft and the idle rollers may freely rotate about their shafts.

Figure 3:
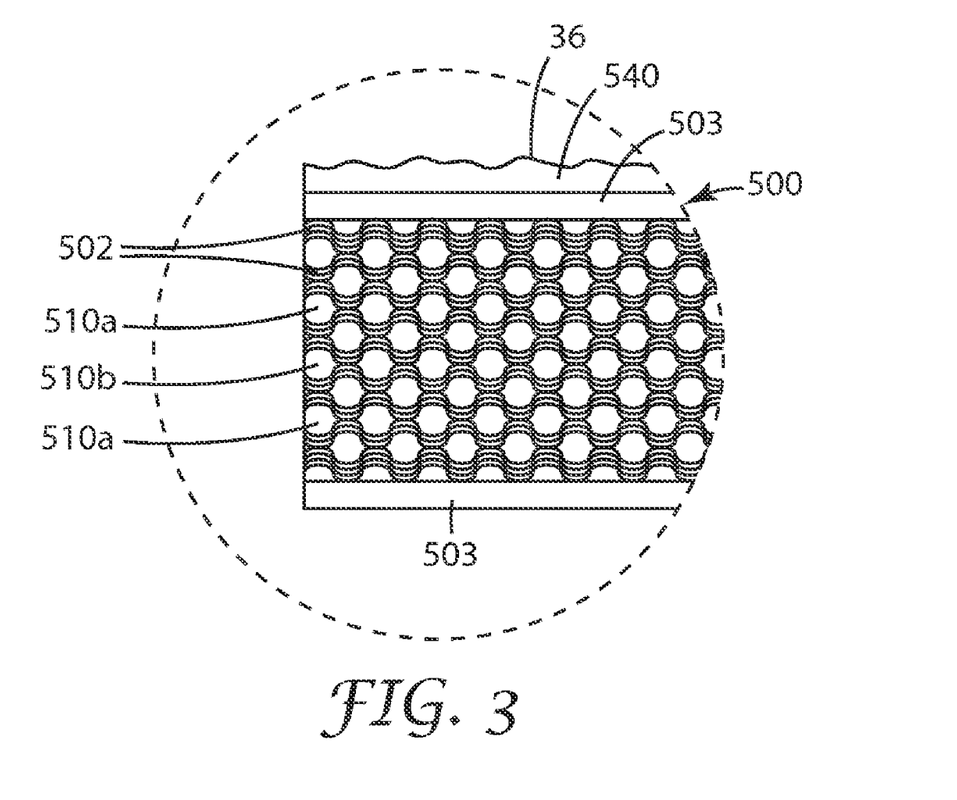
FIG. 3 is an enlarged view of the ribbons of the burner of the flame-perforating apparatus as shown in FIG. 2.

FIG. 3 illustrates a detailed longitudinal view of a portion of the burner 36 useful for forming a heating system in the apparatus 10 of FIG. 1 for purposes of attenuating noise attributable to flame instability of premixed flames supported on the burner as they perform their perforating functions on the film 70. As will be described in more detail in reference to FIG. 5, the burner 36 includes a ribbon burner head assembly 500 similar to the kind commercially available from Flynn Burner, New Rochelle, N.Y. The ribbon burner head assembly 500 has been improved consistent with the teachings of the present disclosure as will be described more fully in regard to FIG. 5. Essentially, the ribbon burner head assembly 500 includes a stack of elongated and continuous corrugated stainless steel ribbons 502 having the same configuration that are suitably joined together (e.g., welding) and sandwiched between plates 503. The ribbon burner head assembly 500 tends to assist in defining an internal plenum 504 (FIG. 5) into which is fed a mixture of pressurized combustion air and gaseous fuel. A mixer (not shown) mixes the air and gaseous fuel prior to the gases entering the plenum 504. This mixture exits a plurality of ports 510a-n (collectively, 510). The ports 510 are located at one end of corresponding passageways 512a-n (collectively, 512) formed by the stacked ribbons 502.

By igniting the expelled mixture, there is projected a premixed flame 520 of substantially uniform intensity from each port 510. The ribbon burner head assembly 500 may come in a variety of sizes, such as from a single row of ports to multiple tiered rows, such as a so-called 8-port (i.e., 8 rows) burner. In the flame-perforating apparatus 10 an 8-port burner may be used. The length of the ribbon burner head assembly may vary depending on the width of film 70 or article to be treated. In this embodiment, the ribbon burner head assembly 500 is about 30 cm. (12 inches) long. With burners of this type, the depth is represented by character "A" (FIG. 5) of the ribbon burner head assembly 500. The depth can vary to control the heat in the passageways and, thereby, attenuation of sound. It will be appreciated, therefore, that the lengths of the passageways 512 are defined by the ribbon burner head assembly depth. As such, the passageway lengths are substantially equal.

In this embodiment, a ribbon burner is typically used for flame-perforation of polymer films, but other types of burners, such as drilled-port or slot burners, may also be used. The burners may perform a variety of functions on articles that include, but are not limited to modifying surfaces of articles including plastics, treating, drying, perforating embossing, cleaning, annealing, sealing, laminating, sterilizing, singeing, baking, vaporizing, branding, and any combination thereof.

Figure 4:
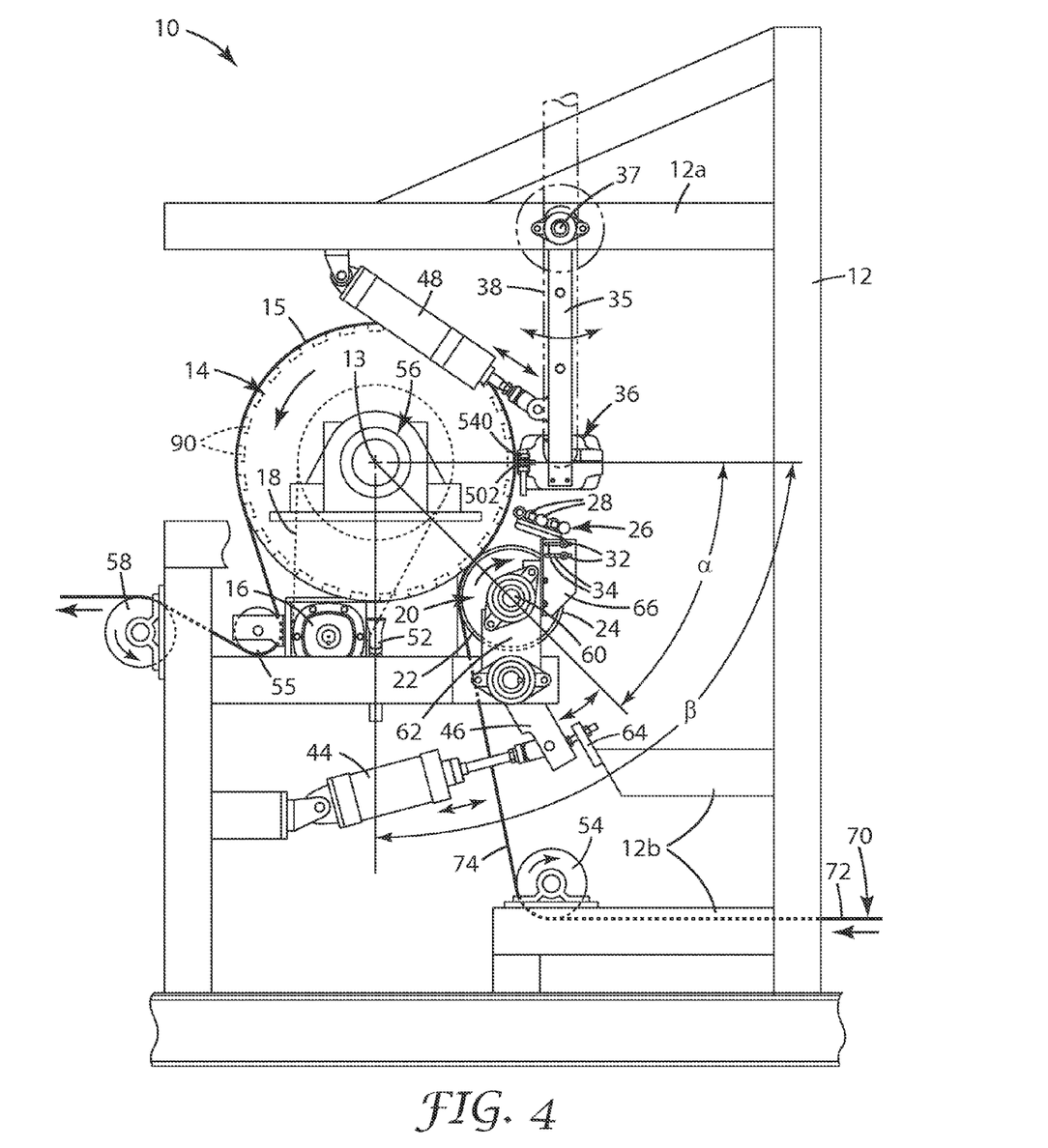
FIG. 4 is a side view of the apparatus of FIG. 1 including the film along a film path in the apparatus.
Figure 5:
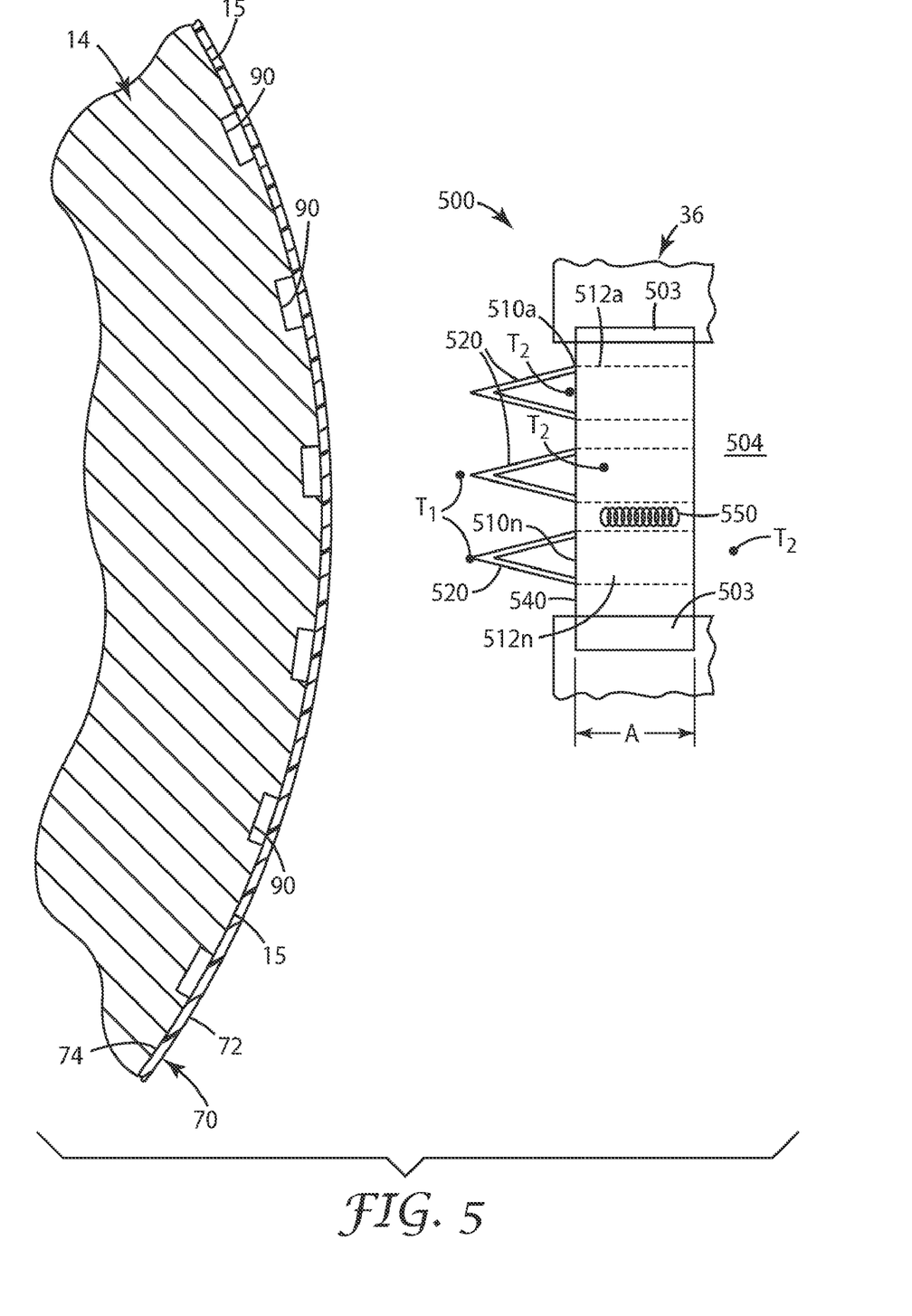
FIG. 5 illustrates a schematic view of a ribbon burner for use in reducing noise according to the present disclosure.

FIG. 4 illustrates the path that the film travels through the flame-perforating apparatus 10 and one exemplary method of flame-perforating films. The film 70 includes a first side 72 and a second side 74 opposite the first side 72. The film travels into the apparatus 10 and around the first idle roller 54. The temperature of the outer film support surface 15 of the backing roll 14 may be controlled by the temperature of the water flowing through the backing roll 14 through shaft 56. The temperature of the outer film support surface 15 may vary depending on its proximity to the burner 36, which generates a large amount of heat from its flames. In addition, the temperature of the film support surface 15 will depend on the material of the film support surface 15. As noted, the flame-perforation process of the present invention is described more completely in U.S. Pat. No. 7,037,100.

The location between the preheat roll 20 and backing roll 14, the preheat roll preheats the first side 72 of the film 70 prior to contacting the film with the flame of the burner. The temperature of the preheat roll 20 assists in eliminating wrinkles or other defects in the film at the flame-perforating step.

In the flame-perforating process, the backing roll 14 continues to rotate moving the film 70 between the burner 36 and the backing roll 14. This particular step is also illustrated in FIG. 5, as well as FIG. 4. When the film 70 comes in contact with the flames of the burner 36, the portions of the film that are directly supported by the chilled metal support surface are not perforated because the heat of the flame passes through the film material and is immediately conducted away from the film by the cold metal of the backing roll 14, due to the excellent heat conductivity of the metal. However, a pocket of air is trapped behind those portions of the film material that are covering the etched indentations or lowered portions 90 of the chilled support material. The heat conductivity of the air trapped in the indentation is much less than that of the surrounding metal and consequently the heat is not conducted away from the film. The portions of film that lie over the indentations then melt and are perforated. As a result, the perforations formed in the film 70 correlate generally to the shape of the lowered portions 90.

After the burner 36 has flame-perforated the film, the backing roll 14 continues to rotate, until the film 70 is eventually pulled away from the film support surface 15 of the backing roll 14 by the idler roller 55. From there, the flame-perforated film 70 is pulled around idler roll 58 by another driven roller (not shown).

FIG. 5 schematically illustrates other aspects of the flame-perforating apparatus 10 in which the improved burner of the present disclosure is utilized. FIG. 5 illustrates the placement of premixed flames 520 relative to the film support surface 15 of the backing roll 14 during the flame-perforating step. In FIG. 5, the burner 36 is at some distance relative to the backing roll 14, but may be positioned closer to the backing roll 14. The relative distance between the burner 36 and backing roll 14 may be adjusted by the burner supports 35 and the actuator 48, as explained above in U.S. Pat. No. 7,037,100. Each flame is a luminous cone supported by the burner, which can be measured from origin to tip with means known in the art. The ribbon burner 36 may have a plurality of flames and typically, all tips are at the same position relative to the burner housing, typically uniform in length. However, the flame tips could vary, for example, depending on non-uniform ribbon configurations or non-uniform gas flow into the ribbons. For illustration purposes, the plurality of flames is represented by a plurality of flames 520.

In FIG. 5, the flames 520 are positioned away from the backing roll 14 and thus, do not impinge the film 70 on the backing roll, and are defined as an "unimpinged flame." In this position, the flame may be easily measured in free space by one skilled in the art to which the present disclosure is related.

Typically, the film 70 is a polymeric substrate. The polymeric substrate may be of any shape that permits perforation by flame and include, for example, films, sheets, porous materials and foams. Typical polymeric substrates are described in the last noted patent.

Reference is now made back to FIG. 5 for illustrating the ribbon burner 36 including the improved ribbon burner head assembly 500 of the present disclosure. As will be described, the present disclosure provides a method for reducing noise characteristics of one or more flames 520 supported on each of one or more ports 510 of the ribbon burner. In one exemplary embodiment, the present disclosure, in effect, significantly lengthens the passageways 512 of the ribbon burner head assembly 500 beyond that normally used. It has been determined that such increase in length increases the heating of the combustible mixture that occur in the passageways 512. As such, the increased passageway heating increases the extent that combustion noise of the premixed flame is attenuated. This may, in part, be due to the enhanced flame stability. While increasing port length or depth appears to increase this preheating temperature in the passageway, it has also been determined that preheating the fuel/oxidizer mixture prior to the plenum 504 does not materially improve flame stability. The present disclosure also determines the heat of the passageway may be increased passively by increasing the values of thermal conductivity of the ribbons relative to that of the stainless steel ribbons which are typically employed in the so-called standard ribbon burner head assembly. Exemplary ones of these materials with increased values of thermal conductivity or combinations thereof include silver, copper, and gold. The amount of heat that is required to suppress or attenuate the noise of the premixed flames will depend on the ribbon burner used and the other operating conditions of the burner. The passive heating of the passageways may occur through the backward heat conduction from the premixed flame. The passive heating may also be generated by convection heating of other premixed flames of the burner. The present disclosure envisions that the passageways may be heated actively, such as by an externally controlled heating element, such as a heating coil 550 located in or adjacent to the passageways 512. Other externally controlled heating approaches may be utilized.

EXAMPLES

The following experimental data are illustrated in the following Tables 1-4. These examples demonstrate the dramatic effect that increasing passageway length, thereby increasing temperature of the passageways of the ribbon burner head assembly 500, has on reducing noise characteristics of the flames. It is pointed out that the burners evaluated in the Tables 2-4 differ primarily in the fact that the ribbon burner head assembly has a different depth (i.e., length of passageway) for each port. A key to the designation values used in the Tables 2-4 is as follows in Table 1, wherein the numerical values in the left column correspond to various empirically derived noise levels, however, the term "Out" refers to the burner firing into air rather than impinging on the backing roll:

TABLE 1

| | |
|---|---|
| Out | Designates burner firing into air rather than impinging against the backing roll. |
| 0 | No detectable burner noise. |
| 1, 2 | Acceptable burner "whistling" or else a faint combustion resonance that may be considered howling. |
| 3 | Minor classic howling, but not overly irritating or objectionable. |
| 4, 5 | Unacceptable howling (unable to converse normally with this level of howling). |
| 6 | Horrendously loud howling that is objectionable even with significant ear protection. |

The experimental conditions common to each evaluation were: 1) a 12 inch-long ribbon burner head assembly was held in aluminum housings that were water cooled to 12-14° C.; 2) the burners were fired against a water-cooled chrome plated steel backing roll held at 25° C. and rotating at an equivalent line speed of 50 m/min (no polymer film was present on the surface of the backing roll); 3) the burner gap was measured from the face of the aluminum burner housing to the backing-roll surface (the separation between the recessed surfaces of the ribbons and the backing-roll is 3 mm greater than this measured burner gap); 4) for each data point, the flame equivalence ratio was varied from 0.90 to 1.05 (the equivalence ratio had no significant effect on the tendency of the burners to howl); 5) the measured oxygen concentration ($[O_2]$) is the volumetric (molar) concentration of molecular $O_2$ in the oxidizer stream (which consists of air and added oxygen), not in the total combustible mixture that also includes the fuel. Note, the normal maximum capacity of an 8-port ribbon burner is 20,000 BTU/hr-in. of burner length (2300 W/cm).

TABLE 2

| Burner face-to-roll gap (mm) | 12,500 Btu/hr-in. and less [O$_2$] = 21% | 15,000 Btu/hr-in. [O$_2$] = 21% | 18,300 Btu/hr-in. [O$_2$] = 21% | 20,000 Btu/hr-in. [O$_2$] = 21% | 12,500 Btu/hr-in. [O$_2$] = 27% | 15,000 Btu/hr-in. [O$_2$] = 27% | 18,300 Btu/hr-in. [O$_2$] = 27% | 20,000 Btu/hr-in. [O$_2$] = 27% |
|---|---|---|---|---|---|---|---|---|
| 8 | 1 | 1 | Highly impinging 1 | Highly impinging 1 | 6 | 6 | 3 | 3 |
| 10 | 1 | 1 | 2 | 2 | 6 | 6 | 3 | 3 |
| 15 | 1 | 1 | 3 | 4 | 5 | 5 | 4 | 4 |
| Out | 1 | 1 | 3 | 4 | 1 | 1 | 3 | 4 |

The data of Table 2 represents a comparative example of the prior art. Table 2 shows comparative testing results using a Flynn 8-port aluminum burner with a ribbon burner head assembly having a 1.25-cm ribbon depth. This data represents a comparative example of the prior art. This kind of burner is typically used in many applications including those for perforating polymeric film. The experimental results indicate that there are several situations in which horrendously loud howling occurred ("6") with such a ribbon burner head assembly. Typically, horrendously loud howling occurred when in a set of conditions, such as when the burner face-to-roll gap had values of about 8 and 10 mm, higher oxygen concentrations (e.g. 27%), and flame power is in a range of about 12,500 and 15,000 BTU/hr-in. Unacceptable howling ("4 & 5") also occurred with high concentrations (e.g. 27%) of oxygen and with the burner face-to-roll gap at about 15 mm. Surprisingly, acceptable burner whistling ("1") occurred when the burner face-to-roll gap was "out" when compared to a similar test in Table 2. Minor classic howling ("3"), but not overly irritating or objectionable, occurred at higher concentrations (e.g. 27%) of oxygen while the flame power was in the range of about 12,550 BTU/hr-in to about the 20,000 BTU/hr-in.

TABLE 3

| Burner face-to-roll gap (mm) | 12,500 Btu/hr-in. and less [O$_2$] = 21% | 15,000 Btu/hr-in. [O$_2$] = 21% | 18,300 Btu/hr-in. [O$_2$] = 21% | 20,000 Btu/hr-in. [O$_2$] = 21% | 12,500 Btu/hr-in. [O$_2$] = 27% | 15,000 Btu/hr-in. [O$_2$] = 27% | 18,300 Btu/hr-in. [O$_2$] = 27% | 20,000 Btu/hr-in. [O$_2$] = 27% |
|---|---|---|---|---|---|---|---|---|
| 8 | 1 | 1 | Highly impinging 1 | Highly impinging 1 | 1 | 1 | 3 | 3 |
| 10 | 1 | 1 | 1 | 1 | 0 | 1 | 3 | 3 |
| 15 | 1 | 2 | 2 | 1 | 0 | 1 | 3 | 3 |
| Out | 1 | 2 | 2 | 1 | 0 | 1 | 3 | 4 |

Table 3 is data obtained for a Flynn 8-port aluminum burner, similar to that as used in Table 2, with the major difference being the ribbon burner head assembly having a 2.50-cm ribbon depth. This increased the passageway length, thereby increasing heating in the passageway. A comparison of the results of Table 3 with Table 2 for those ranges of operating conditions wherein the noise characteristics from Table 3 were considered unacceptable or horrendous (i.e., "6"), the noise characteristics for the 2.50 ribbon depth were significantly improved (e.g., in the range of "1"). In addition, it was observed that noise levels in Table 2 with the BTU/hr-in. at 18,300 and 20,000 were significantly higher (compared to Table 3) with the shorter passageways. Moreover, it was noted that at the above BTU/hr-in. at 18,300 and 20,000 values noise was attenuated significantly, when the burner face-to-roll gap as "Out" (i.e., no impingement of the flame on the backing roll). Accordingly, the increase of heating in the longer passageways significantly increased the attenuation of noise generated by the premixed flames.

TABLE 4

| Burner face-to-roll gap (mm) | 12,500 Btu/hr-in. and less [O$_2$] = 21% | 15,000 Btu/hr-in. [O$_2$] = 21% | 18,300 Btu/hr-in. [O$_2$] = 21% | 20,000 Btu/hr-in. [O$_2$] = 21% | 12,500 Btu/hr-in. [O$_2$] = 27% | 15,000 Btu/hr-in. [O$_2$] = 27% | 18,300 Btu/hr-in. [O$_2$] = 27% | 20,000 Btu/hr-in. [O$_2$] = 27% |
|---|---|---|---|---|---|---|---|---|
| 8 | 0 | 0 | Highly impinging 1 | Highly impinging 1 | 0 | 0 | 2 | 3 |
| 10 | 0 | 0 | 1 | 1 | 0 | 0 | 1 | 3 |
| 15 | 0 | 1 | 1 | 1 | 0 | 0 | 1 | 3 |
| Out | 0 | 1 | 1 | 1 | 0 | 0 | 1 | 3 |

Table 4 is data gathered for a Flynn 8-port aluminum burner, similar to that as used in Table 2, with the major difference being a 3.50-cm ribbon depth. This burner was not constructed with a single ribbon assembly, but with two ribbon assemblies that were joined together. Each ribbon assembly had a thickness of about 1.75 cm. The increase in port depth was achieved by combining a 1.75 cm ribbon burner head assembly to 1.75 cm thick ribbon burner head assembly. The noise values in Table 4 were significantly superior to those in Table 3 and Table 2. Also, with longer passageways the noise values when the burner face-to-roll gap was "Out" were significantly better.

It is evident that as the ribbon passageways of the ribbon burners increased in length the greater was the degree of noise attenuation. One explanation for the improved results arises for the use of deeper ribbons. A longer passageway length will increase the preheating of the combustible mixture as the fuel/air gas passes through the ribbon burner head assembly. As such, there is likelihood that the stability of the flames supported on the ribbon burner is thereby improved. From a comparison of the above values, it is evident that a trend exists which demonstrates that longer passageways are beneficial or, stated differently, the results mean that longer/deeper ports lead to quieter flames at all conditions, but particularly with oxygen enrichment. It is believed that the longer port "length" will increase the preheating of the combustible mixture as the gas passes through the ribbons, thereby enhancing the stability of the flames supported on those ribbons.

The present disclosure envisions a method of correcting for the presence of objectionable noise of premixed flames from one or more burner ports. In this regard, a user can determine a noise level of the premixed flames. This can be done based on the user experience or based on devices that measures sound levels. The user may then determine the temperature of selected ones of the one or more passageways associated with objectionable noise levels. The temperature can be measured in any suitable manner. The invention contemplates adjusting the heating of the one or more passageways to an extent such that combustion noise level of the premixed flame is attenuated. In another exemplary embodiment, heat may be applied actively as by the heating element 550. Heating may be added to the plenum by, for example, electric resistance heating. Alternatively, the passageways may be increased in length, such as by adding an additional ribbon burner head assembly.

It will be appreciated that the present disclosure provides a burner having a ribbon burner head assembly, wherein the ribbon burner head assembly includes a plurality of stacked and corrugated ribbons defining at least one row of passageways terminating in ports from which a premixed flame emanates, the improvement comprising the ribbons defining the rows of ports such that each passageway has a depth in a range of about 1.5 cm. to about 4 cm. or more.

While the present disclosure discloses the improved burner in a flame-perforating device, it will be appreciated that the present disclosure is broadly related to attenuating noise of premixed flames generated from burners having ports which support the premixed flames. Accordingly, there is a broadly disclosed a process of applying heat to an article in a device to perform a function on the article by heat generated by at least a premixed flame provided by a burner coupled to the device, wherein the burner includes at least one passageway through which a fuel/oxidizer mixture flows toward a port from which the premixed flame emanates, wherein the improvement comprises: heating the one passageway to an extent such that combustion noise of the premixed flame is attenuated. As noted the heating may be done actively by an external heat source, by extending the length of the passageways, or changing the thermal conductivity of the burner head assembly. Contemplated by the present disclosure are functions performed on articles, wherein the function is from a group of functions consisting of modifying the surface of materials including plastics, treating, drying, embossing, perforating, cleaning, annealing, sealing, laminating, sterilizing, singeing, baking, vaporizing, branding, and any combination thereof.

The present disclosure also provides a method for controlling noise characteristics of a flame supported by one or more ports of a burner. One explanation for the effect of the noise attenuation is that such is achieved by controlling a temperature differential ($T_1-T_2$) between a first location $T_1$ and a second location $T_2$. The first location $T_1$ may be in or slightly beyond a leading edge (i.e. tip) of the premixed flame 520 (in the hot product gases). If the first location $T_1$ is the flame, such will be considered a convenient point in order to measure the temperature of the flame. The second location $T_2$ may be in an uncombusted portion of a fuel/oxidizer mixture generating the premixed flame. In one exemplary embodiment, the second location $T_2$ should, ideally, be immediately adjacent the base of the flame, as illustrated in FIG. 5, such as external of and immediately adjacent the external wall 540. Alternatively, the second location could be selected at some location in the passageway, or in the plenum chamber 504.

Significantly, the present disclosure recognizes that noise characteristics of the flame are changed by controlling the temperature differential between the noted first and second locations. Measurement of the temperatures at these points may be accomplished by using known techniques, such as thermocouples suitable for high temperatures. More specifically, it has been determined that noise attenuation is achieved by reducing the noted temperature differential. Accordingly, by heating the burner, the temperature at the second location will increase. Correspondingly, the temperature differential between the first point and the second point decreases. Indeed, the howling can be reduced by further reducing the temperature differential. In one example, howling noise was present when the temperature at location $T_1$ was measured at about 2200° K; and the temperature at location $T_2$ was measured at about 500° K. Howling was reduced or eliminated when the temperature at location $T_2$ was raised to about 550° K, while the temperature at location $T_1$ remained substantially constant. Other temperature ranges are contemplated.

An aspect of the present disclosure is to implement a method, system and apparatus for controlling noise characteristics of flames, particularly premixed flames. Another aspect of the present disclosure is to implement methods, systems and apparatus for eliminating or reducing noise characteristics of premixed flames. Another aspect of the present disclosure is to implement methods, systems and apparatus for implementing the foregoing in a simple, reliable and efficient manner. Still another aspect of the present disclosure is to implement methods, systems and apparatus for implementing the foregoing in a highly economical manner.

The aspects described herein are merely a few of the several that can be achieved by implementing the present disclosure. The foregoing descriptions thereof do not suggest that the present disclosure must only be utilized in a specific manner to attain the foregoing aspects. The above embodiments have been described as being accomplished in a particular sequence, it will be appreciated that such sequences of the operations may change and still remain within the scope of the present disclosure

What is claimed is:

1. A method for controlling noise characteristics of a flame supported on one or more ports of a burner, the method comprises: controlling a temperature differential between a first location and a second location, wherein the first location is in a flame or immediately adjacent a leading edge of the flame, and the second location is in an uncombusted portion of a fuel/oxidizer mixture generating the flame, whereby noise characteristics of the flame are changed by controlling the temperature differential.

2. The method of claim 1, wherein the temperature differential is reduced by applying heating to the second location.

3. The method of claim 2, wherein the heat applied is passive heat.

4. The method of claim 3, wherein the passive heating is generated by one or more premixed flames.

5. The method of claim 3, wherein the passive heating is generated by backward convective heating of a premixed flame supported on respective one of the ports.

6. The method of claim 2, wherein the heating is performed actively.

7. A method of attenuating noise of premixed flames, the method comprises:
controlling the temperature differential of a premixed flame supported on at least one port of a burner, wherein the temperature differential is determined between a first location and a second location, wherein the first location is in the premixed flame or immediately adjacent a leading edge of the flame, and the second location is in an uncombusted portion of the fuel/oxidizer mixture generating the premixed flame so that the temperature differential between the first and second locations is reduced, whereby the noise of the premixed flame supported on the one port is attenuated.

8. A method of attenuating combustion noises of premixed flames, the method comprises: generating a premixed flame from a burner port defined by each of one or more generally linear passageways in a burner body; and heating selected ones of the linear passageways to an extent such that combustion noise of the premixed flame is attenuated.

9. The method of claim 7, wherein the temperature differential is reduced by applying heating to the second location.

10. The method of claim 9, wherein the heat applied is passive heat.

11. The method of claim 10, wherein the passive heating is generated by one or more premixed flames.

12. The method of claim 10, wherein the passive heating is generated by backward convection heating of a premixed flame supported on a respective one of the ports.

13. The method of claim 8, wherein the heating is performed actively by supplying heat from a heating element.

14. A method of correcting for the presence of objectionable noise of premixed flames from one or more burner ports defined by each of one or more passageways in a burner body, the method comprises: determining a noise level of the premixed flames; determining the temperature of selected ones of the one or more passageways associated with a noise level; and, adjusting the temperature of the one or more passageways to an extent such that combustion noise level of the premixed flame is attenuated.

15. An apparatus for controlling noise characteristics of a premixed flame, the apparatus comprises: a burner body having at least one generally linear passageway, through which a fuel/oxidizer mixture flows to a port, on which a flame is supported, the burner body includes at least one element in or adjacent to the passageway that changes the temperature of an uncombusted portion of the mixture in the passageway relative to a combusted portion of the fuel mixture, so as to change a temperature differential between the uncombusted and combusted portions, whereby the noise characteristic of the flame is changed.

16. An apparatus as defined in claim 15, wherein the burner body includes at least one element that increases the temperature of an uncombusted portion of the mixture relative to a combusted portion of the fuel/oxidizer mixture.

17. An apparatus for attenuating combustion noises of premixed flames, the apparatus comprises: a burner body having at least one passageway, through which a fuel/oxidizer mixture flows, leading to a port on which a premixed flame is supported; the burner body including at least one element being constructed of a material having a high thermal conductivity in the passageway and a portion defining a length of the at least one passageway such that passive heat generated by at least the premixed flame heats the one passageway to an extent for attenuating the combustion noises of a premixed flame.

18. An apparatus for attenuating combustion noises of premixed flames, the apparatus comprises: a burner body having at least one generally linear passageway, through which a fuel/oxidizer mixture flows, leading to a port from which a premixed flame emanates; the burner body including at least one element in or adjacent the linear passageway that is operable for actively heating the one linear passageway to an extent such that the combustion noises of the premixed flame are attenuated.

19. A method of attenuating combustion noises of a premixed flame, the method comprises: generating a premixed flame from at least a burner port defined by at least a passageway in a burner body; and heating selected uncombusted air/gases used for the premixed flame in the passageway to an extent such that combustion noise of the premixed flame is attenuated independent of flame equivalence ratios of the premixed flame.

20. The method of claim 19, wherein the flame equivalence ratio varies from about at least about 0.90 to about 1.05.

* * * * *